（12）United States Patent
Middleton

(10) Patent No.: US 6,195,431 B1
(45) Date of Patent: Feb. 27, 2001

(54) ROTATIONAL HINGE DAMPING MECHANISM

(75) Inventor: David Desmond Middleton, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/133,358

(22) Filed: Aug. 13, 1998

(51) Int. Cl.[7] .................................................. H04M 1/00
(52) U.S. Cl. ............................................................. 379/433
(58) Field of Search .................................... 379/433, 428; 455/575, 90; 16/53, 58, 52, 54, 68

(56) References Cited

U.S. PATENT DOCUMENTS 4,358,870 * 11/1982 Hong ........................................ 16/53

* cited by examiner

Primary Examiner—Jack Chiang
(74) Attorney, Agent, or Firm—Jenkens & Gilchrist, P.C.

(57) ABSTRACT

A rotational hinge for use with a flip cover moveable between a first position and a second position in response to a biasing force is disclosed. The rotational hinge includes a housing integrated with a flip cover and capable of rotational movement about a central axis between the first and second positions. A torsional spring mechanism integrated with the housing converts a biasing force along the central axis of the housing into rotational movement about the central axis of the housing when moved from the first to the second positions. A damping mechanism connected to the torsional spring mechanism damps the biasing force along the central axis of the housing.

16 Claims, 3 Drawing Sheets

ROTATIONAL HINGE DAMPING MECHANISM

BACKGROUND OF THE INVENTION

1. Technical Field of the Invention

The present invention relates to rotational hinge mechanisms, for example, those used on the flip cover of a cellular telephone, and more particularly, to a method for damping a spring biased motion of a rotational hinge mechanism.

2. Description of Related Art

Rotational hinge mechanisms are utilized on devices that contain a so called "flip cover" that rotates between closed and opened positions on an attached body. One widespread use of a rotational hinge mechanism is within cellular telephone products wherein a flip cover is used to cover a keypad of the telephone when it is not in use. The flip cover may also include a microphone for receiving voice input from a user of the telephone when the flip cover is in the extended position. The rotational hinge mechanism for flip covers utilizes a spring-loaded action to move between the opened and closed positions. Existing rotational damping mechanisms utilize a disc shaped blade which rotates in shallow reservoir of viscous fluid. The mechanism is attached to the axis of the rotational hinge mechanism of the flip cover such that the disc shaped blade rotates about the axis of the rotational hinge.

This type of damping mechanism requires a relatively large diameter disc shaped blade in order to effectively damp the motion of the flip cover. In cellular telephone applications, where size is important, the thickness of the device must be minimized. Thus, a damping mechanism having a large diameter disc shaped blade works against the desire for smaller cellular telephone units. Thus, some manner for damping the motion of a rotational spring using a smaller mechanism is desired.

SUMMARY OF THE INVENTION

The present invention overcomes the foregoing and other problems with a rotational hinge for use with a flip cover that is moveable between a first position and a second position with respect to a fixed body, such as a cellular telephone. A circular housing integrated with a flip cover is capable of rotational movement about a central axis between a first position and a second position. Within the housing is defined a fluid chamber for containing a viscous fluid.

A follower is integrated with the body of the cellular telephone and a cam rotatably engages the follower and is linearly moveable from a first position on the central axis of the housing to a second position on the central axis of the housing in conjunction with movement of the housing between the first and second positions. A spring biases the cam to the first position.

A piston having a stem connected to the cam moves through the viscous fluid along the central axis of the housing in response to movement of the cam. Movement of the piston through a viscous fluid within the fluid chamber damps the movement of the piston and the attached cam. Movement of fluid past the piston may be between the edges of the piston and the walls of the fluid chamber or through a number of holes within the surface of the piston.

In an alternative embodiment, the damping mechanism may consists of a separate housing which is insertable within the housing integrated with the flip cover. This housing encloses the piston and viscous fluid through which the piston is pulled. A stem extends from the housing and attaches with the cam in a manner similar to the first embodiment.

BRIEF DESCRIPTION OF THE DRAWINGS

For a more complete understanding of the present invention, reference is made to the following Detailed Description taken in conjunction with the accompanying drawings wherein.

DETAILED DESCRIPTION OF THE INVENTION

Figure 1:
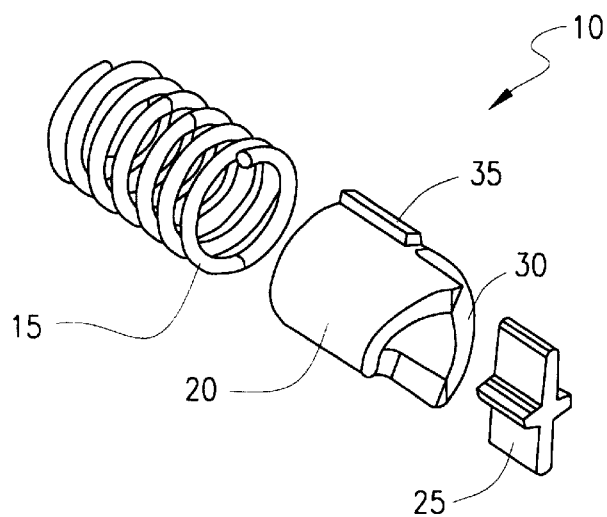
FIG. 1 is a perspective view of a spring and cam/follower arrangement.
Figure 2:
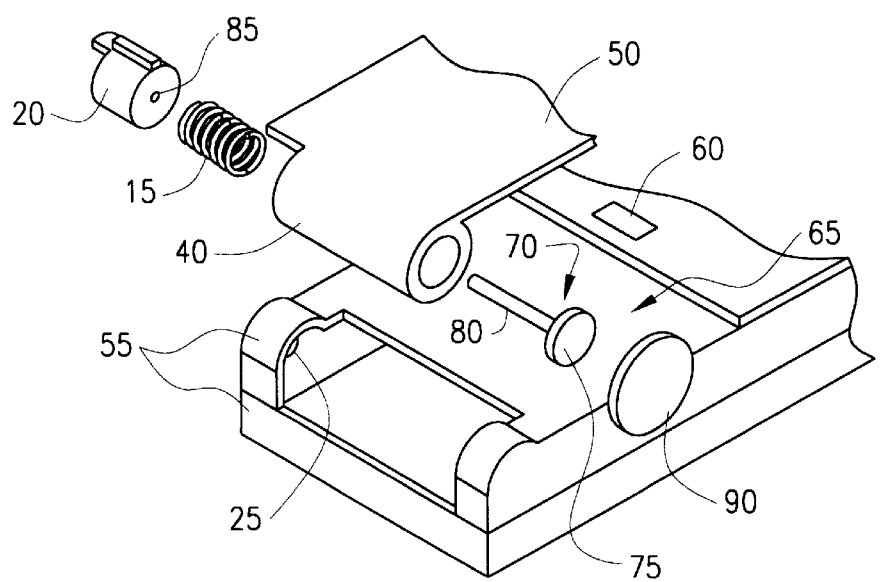
FIG. 2 is a perspective view of a cellular telephone and flip cover which are attached via a rotational hinge.

Referring now to the Drawings, and more particularly to FIGS. 1 and 2, there is illustrated a spring loaded mechanism for providing a torsional spring load to the flip cover 50 of a cellular telephone. The torsional spring mechanism 10 consists of a spring 15 and a cam 20/follower 25 arrangement. The torsional spring mechanism 10 translates linear motion of the cam 20 into rotational motion for the flip cover 50. The cam 20 comprises a cylindrical device having a helical path 30 around its perimeter. The cam 20 further defines a rib 35 for engaging a slot 40 defined within a circular housing 45 integral with the flip cover 50.

It should be noted, that the torsional spring loading mechanism 10 may take other forms than those illustrated in the figures. Other types of materials and designs may be used in place of the compression spring 15, such as elastomers or compliant foams. Furthermore, many different shapes may be utilized within the cam 20/follower 25 portion, such as a detent type mechanism while still remaining within the spirit of the present invention.

The follower 25 is integral with the cellular telephone body 55. The cam 20 is inserted within the circular housing 45 such that the helical path 30 around the perimeter of the cam 20 is forced against the follower 25 by the spring 15. The rib 35 affixes the cam to the circular housing 45 such that the housing rotates with the cam 20. As the flip portion 50 is moved from the opened to the closed position, the slot 40 of the circular housing 45 acts on the rib 35 of the cam 20 to rotate the cam about the axis of the housing. As the cam 20 rotates, the helical edge 30 causes the cam 20 to rotate along the follower 25 and move the cam 20 in a linear direction that forces the spring 15 to compress in the closed position. When moving from the closed position to the opened position, the rotation of the slot 40 of the circular housing 45 rotates the cam 20 in the opposite direction causing the cam to move in a linear direction that causes the spring to open to its biased position. Thus, when the flip cover 50 is in the closed position, the natural biasing forces of the spring 15 will tend to force the flip cover to the opened position. A latching mechanism 60 is required to maintain the flip cover 50 in the closed position.

Figure 3A:
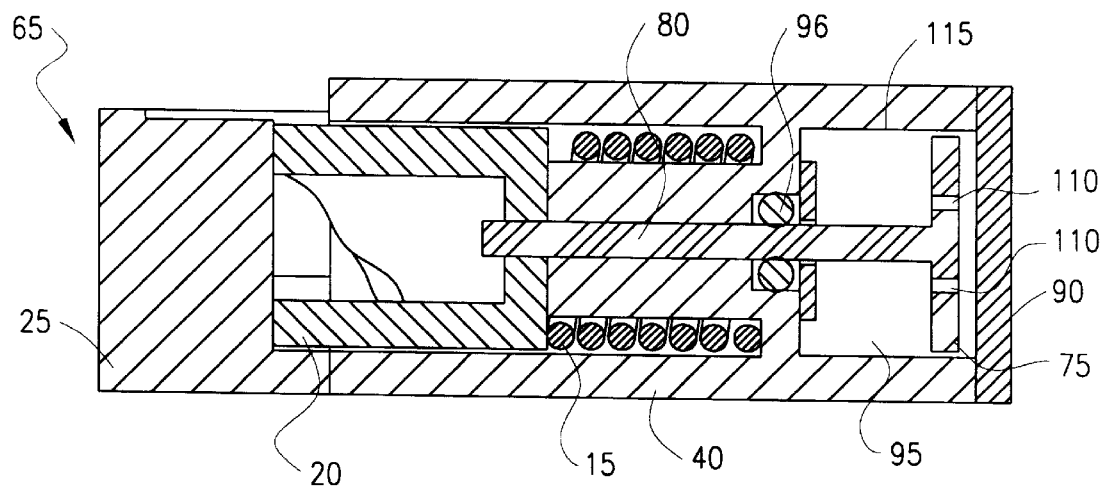
FIGS. 3a and 3b are cross-sectional views of the damping mechanism of the present invention in the closed and opened positions, respectively.
Figure 3B:
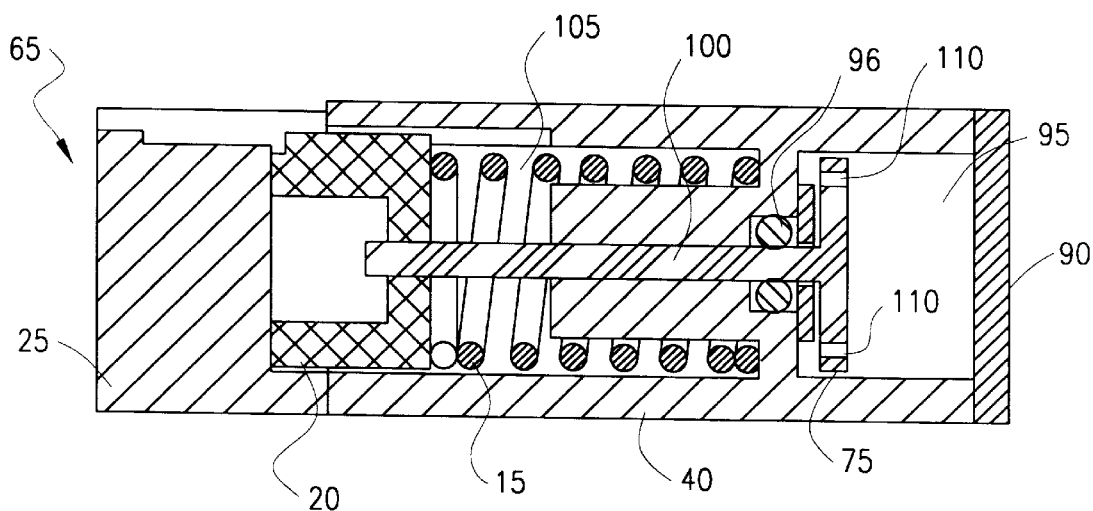

Referring now to FIGS. 2, 3a and 3b, there is illustrated the damping mechanism 65. The damping mechanism 65 consists of a piston 70 and end cap 90 which encloses the piston within a fluid chamber 95 inside of the circular housing 40. The piston 70 includes an end plate 75 having a stem 80 extending perpendicularly therefrom. The stem 80 passes through the fluid chamber 95 and along a passage 100 separating the fluid chamber 95 from a spring chamber 105. The stem 80 is affixed within an opening 85 on the cam 20. The end cap 90 encloses the fluid chamber 95 enabling a viscous fluid to be maintained therein. A seal 96 prevents fluid from moving between chambers 95 and 105.

In a first embodiment, the end plate 75 of the piston 70 defines a number of holes 110 (holes not depicted) therein, enabling the passage of fluid therethrough as the end plate 75 is moved back and forth across the fluid chamber 95. Alternatively, the holes 110 may be excluded and the circumference of the end plate 75 such that there is a clearance between the circumference of the plate 75 and the wall of the fluid chamber which enables the passage of fluid.

When the flip cover 50 is in the closed position, as illustrated in FIG. 3(a), the cam 20 forces the spring 15 to a compressed position and forces the piston 70 to a position close to the end cap 90. As illustrated in FIG. 3b, as the flip portion 50 is moved to the open position, the spring 15 and rotation of the circular housing 45 forces the cam 20 to an open position which pulls the piston toward the center of the circular housing 45. As this happens, the passage of viscous fluid either through the holes 110 or around the edges of the end plate 75 damp the opening motion of the flip cover 50 such that a controlled opening is enabled. In this way, opening of the flip cover due to the biasing forces of the spring 15 is offset by the drag created by the piston 70 through the viscous fluid of the fluid chamber 95.

As the piston 70 is pulled through the viscous fluid, the linear motion of the cam 20 is damped, which in turn damps the rotational motion of the flip cover 50. The amount of damping may be controlled by the size of the clearance between the end plate 75 and the sidewalls 115 or the size of the holes 110 in the end plate. Alternatively, the damping effects may be controlled by the viscosity of the fluid within the fluid chamber 95.

Figure 4:
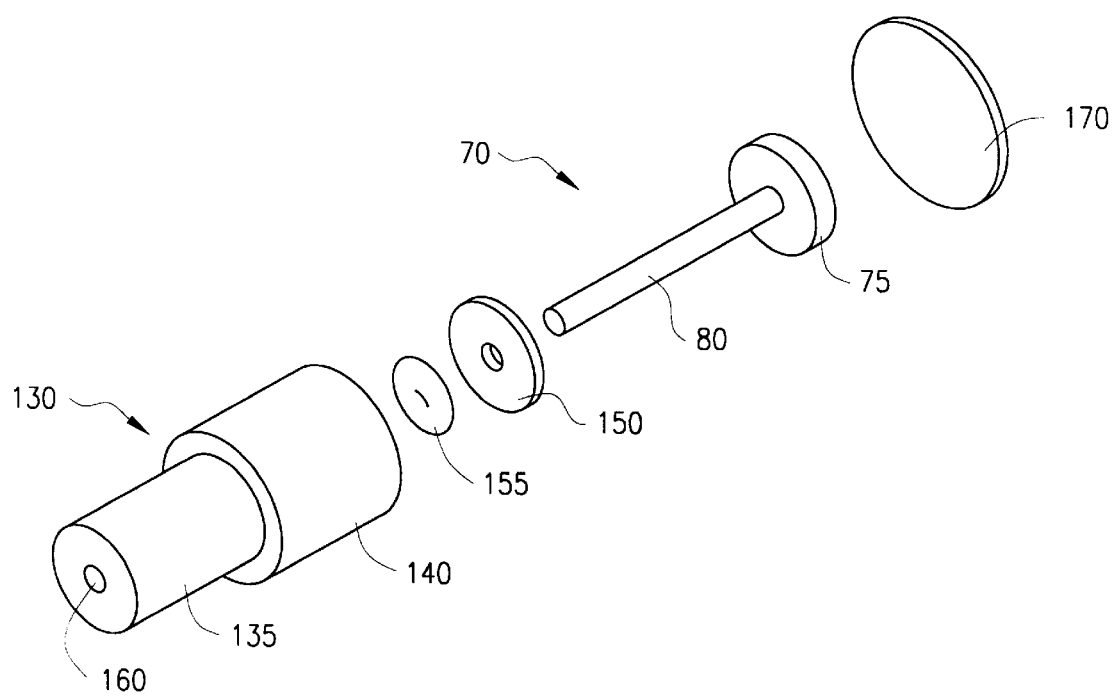
FIG. 4 is an exploded perspective view of an alternative embodiment of the damping mechanism of the present invention.
Figure 5:
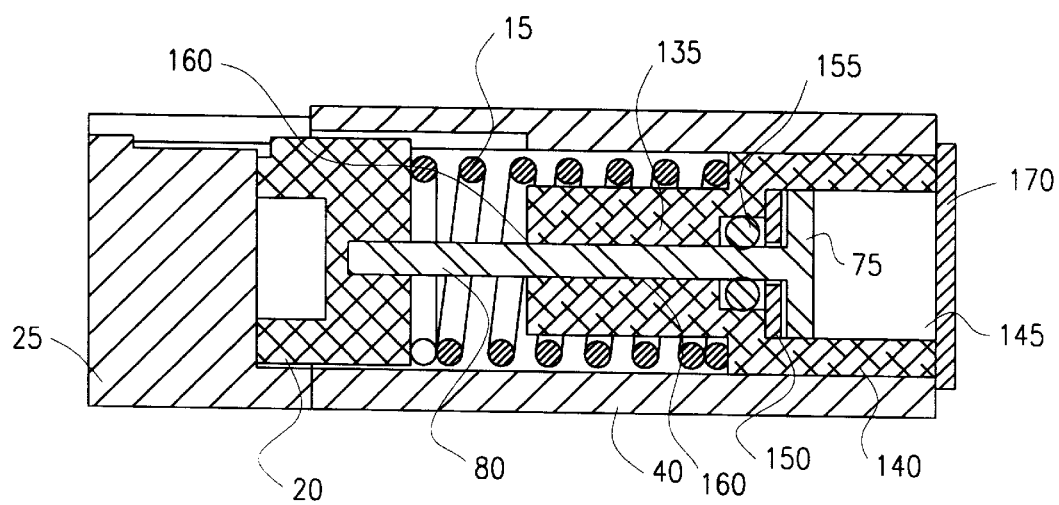
FIG. 5 is a cross-sectional view of the alternative embodiment of the damping mechanism.

FIGS. 4 and 5 illustrate an exploded perspective view and a cross-sectional view of an alternative embodiment of the damping mechanism 65. In this embodiment, the damping mechanism 65 comprises a self contained modular unit which may be inserted into the circular housing 45. The modular unit consists of a housing 130 including a first cylindrical portion 135 onto which the spring 15 may be placed. A second cylindrical portion 140 is configured to enable the modular unit to be inserted within the circular housing 45. A fluid chamber 145 is defined within the second cylindrical portion 140 and contains the piston 65. A washer 150 and 0-ring 155 are inserted over the stem 80 of the piston 70 to seal the fluid chamber 145 from the channel 160 enabling the stem 80 of the piston 70 to interact with the cam 20. An end cap 170 encloses the piston 70 and a viscous fluid within the fluid chamber 145. The piston stem 80 extending out of the modular unit is affixed to the cam 20 as described previously. The movement of the piston 70 within the fluid chamber 145 creates a damping effect on the rotational motion of the flip portion 50 by damping the linear motion of the cam 20 as described previously.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A rotational hinge for use with a flip cover moveable between an open position and a closed position with respect to a body, comprising:

a housing integrated with the flip cover and capable of rotational movement about a central axis between the open position and the closed position;

means integrated with the housing for converting a linear biasing force along the central axis of the housing into rotational movement about the central axis for the housing from the open position to the closed position, wherein the biasing force biases the flip cover to the open position; and a damping mechanism for damping the biasing force along the central axis of the housing provided by the means for converting.

2. The rotational hinge of claim 1, wherein the means for converting further comprises:

a follower integrated with the body;

a cam rotatably engaging the follower, the cam linearly moveable from a first position on the central axis of the housing to a second position on the central axis of the housing in conjunction with movement of the housing between the open position and the closed position; and a spring for biasing the cam to the first position on the central axis of the housing.

3. The rotational hinge of claim 1, wherein the housing further defines a fluid chamber for containing a viscous fluid and the damping mechanism further comprises:

a piston connected to the means for converting, the piston moveable through the fluid chamber along the central axis of the housing, wherein movement of the piston through the viscous fluid of the fluid chamber damps movement of the piston and the attached means for converting.

4. The rotational hinge of claim 3, wherein the piston includes:

a plate perpendicular to the central axis of the housing, the plate positioned such that an opening exists between edges of the plate and walls of the fluid chamber; and at least one member for interconnecting the plate to the means for converting.

5. The rotational hinge of claim 3, wherein the piston further includes:

a plate perpendicular to the central axis of the housing, the plate defining at least one hole therein to enable the viscous fluid to pass therethrough; and at least one member for interconnecting the plate to the means for converting.

6. The rotational hinge of claim 1, wherein the damping mechanism further comprises:

a second housing insertable within the housing defining a fluid chamber for containing a viscous fluid; and a piston connected to the means for converting, the piston moveable through the fluid chamber along the central axis of the housing, wherein movement of the piston through the viscous fluid of the fluid chamber damps movement of the piston and the attached means for converting.

7. A rotational hinge for use with a flip cover on an electronic device, the flip cover moveable between an open position and a closed position with respect to a body, comprising:

a housing integrated with the flip cover and capable of rotational movement about a central axis between the open position and the closed position, wherein the housing defines a single fluid chamber for containing a viscous fluid;

a follower integrated with the body;

a cam rotatably engaging the follower, the cam linearly moveable from a first position on the central axis of the housing to a second position on the central axis of the housing in conjunction with rotational movement of the housing between the open position and the closed position;

a spring biasing the cam to the open position of the housing; and a piston connected to the cam and moveable through the viscous fluid along the central axis of the housing, wherein movement of the piston through the viscous fluid damps movement of the piston and the attached cam, said piston comprising:

a plate enclosed within the single fluid chamber dividing the single fluid chamber into a first portion and a second portion, the plate having a first side and a second side, wherein the viscous fluid may pass between the first portion and the second portion of the single fluid chamber, as the plate moves within the chamber; and a stem extending perpendicularly from and connected to the second side of the plate.

8. The rotational hinge of claim 7, wherein the piston includes:

a plate perpendicular to the central axis of the housing, the plate positioned such that an opening exists between edges of the plate and walls of the fluid chamber; and at least one member for interconnecting the plate to the means for converting.

9. The rotational hinge of claim 7, wherein the piston further includes:

a plate perpendicular to the central axis of the housing, the plate defining at least one hole therein to enable the viscous fluid to pass therethrough; and at least one member for interconnecting the plate to the means for converting.

10. The rotational hinge of claim 7, further including an end plate for enclosing the fluid chamber.

11. The rotation hinge of claim 7 further including:

a rib extending from the cam; and wherein the housing further defines a slot for receiving the rib.

12. A damping mechanism for use with a flip portion moveable between an open position and a closed position with respect to a body in response to a torsional spring mechanism associated with the flip portion, comprising:

a housing defining a single fluid chamber, having a central axis, for containing a viscous fluid; and a piston connected to the torsional spring mechanism and moveable through the fluid chamber along the central axis of the housing, wherein movement of the piston through the viscous fluid of the fluid chamber damps movement of the piston and the attached torsional spring mechanism, said piston comprising:

a plate enclosed within the single fluid chamber dividing the single fluid chamber into a first portion and a second portion, the plate having a first side and a second side, wherein the viscous fluid may pass between the first portion and the second portion of the single fluid chamber as the plate moves within the chamber; and a stem extending perpendicularly from and connected to the second side of the plate.

13. The rotational hinge of claim 12, wherein the piston includes:

a plate perpendicular to the central axis of the housing, the plate positioned such that an opening exists between edges of the plate and walls of the fluid chamber; and at least one member for interconnecting the plate to the means for converting.

14. The rotational hinge of claim 12, wherein the piston further includes:

a plate perpendicular to the central axis of the housing, the plate defining at least one hole therein to enable the viscous fluid to pass therethrough; and at least one member for interconnecting the plate to the means for converting.

15. The damping mechanism of claim 11, wherein the housing may be inserted within a second housing associated with the flip portion.

16. The damping mechanism of claim 11 further including an end cap for enclosing the fluid chamber.

* * * * *